United States Patent
Nader

(10) Patent No.: US 8,638,715 B2
(45) Date of Patent: Jan. 28, 2014

(54) POWER-EFFICIENT ACCURATE MICH MONITORING IN A MOBILE COMMUNICATION SYSTEM

(75) Inventor: Ali Nader, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1111 days.

(21) Appl. No.: 12/474,302

(22) Filed: May 29, 2009

(65) Prior Publication Data

US 2010/0303023 A1   Dec. 2, 2010

(51) Int. Cl.
  *H04W 4/00* (2009.01)
(52) U.S. Cl.
  USPC ............................. 370/328; 370/329; 370/338
(58) Field of Classification Search
  USPC .......................................................... 370/328
  See application file for complete search history.

(56) References Cited

U.S. PATENT DOCUMENTS

| | | | |
|---|---|---|---|
| 7,349,711 B2 | 3/2008 | Hu et al. | |
| 7,366,124 B2 | 4/2008 | Lee et al. | |
| 7,969,932 B2* | 6/2011 | Fischer | 370/328 |
| 8,223,689 B2* | 7/2012 | Fischer | 370/328 |
| 8,260,292 B2* | 9/2012 | Fischer | 370/328 |
| 2005/0195760 A1 | 9/2005 | Lee et al. | |
| 2005/0195852 A1* | 9/2005 | Vayanos et al. | 370/437 |
| 2005/0232176 A1 | 10/2005 | Van Lieshout et al. | |
| 2005/0233732 A1 | 10/2005 | Kwak et al. | |
| 2005/0245260 A1 | 11/2005 | Nielsen et al. | |
| 2005/0249141 A1 | 11/2005 | Lee et al. | |
| 2005/0271007 A1 | 12/2005 | Hwang et al. | |
| 2005/0282528 A1* | 12/2005 | Charpentier et al. | 455/414.2 |
| 2005/0288040 A1* | 12/2005 | Charpentier et al. | 455/458 |
| 2006/0019641 A1* | 1/2006 | Vayanos et al. | 455/414.1 |
| 2006/0034214 A1* | 2/2006 | Moon et al. | 370/328 |
| 2006/0040655 A1 | 2/2006 | Kim | |
| 2006/0067289 A1* | 3/2006 | Lee et al. | 370/338 |
| 2006/0067361 A1* | 3/2006 | Lee et al. | 370/338 |

(Continued)

FOREIGN PATENT DOCUMENTS

EP  1 608 196 A1  12/2005
WO  2006/031019 A1  3/2006

OTHER PUBLICATIONS

Valtanen, J., "Transport Formats in UMTS Radio Network Controller's Software Implementation", Helsinki University of Technology, Department of Electrical and Communications Engineering Communications Laboratory, Master's Thesis, Espoo Jan. 7, 2008.

(Continued)

*Primary Examiner* — Ian N Moore
*Assistant Examiner* — Jenee Alexander
(74) *Attorney, Agent, or Firm* — Potomac Patent Group PLLC; Kenneth B. Leffler

(57) ABSTRACT

In a mobile communication system, receiving changed information for a service of interest in a next modification period comprises determining in a current modification period whether an alarm bit whose assertion indicates upcoming changed information is unambiguously associated with the service of interest or whether the alarm bit is associated with the service of interest and one or more services that are not of interest. Mappings of all services to alarm bits are analyzed in the present and possibly in one or more upcoming frames during the current modification period and applied in embodiments to reduce the ambiguity and therefore the risk of false indications of changed data for the service of interest.

12 Claims, 8 Drawing Sheets

(56) References Cited

U.S. PATENT DOCUMENTS

| | | | |
|---|---|---|---|
| 2006/0094478 A1 | 5/2006 | Kim et al. | |
| 2006/0128433 A1 | 6/2006 | Liang et al. | |
| 2006/0146858 A1* | 7/2006 | Kim | 370/328 |
| 2006/0176838 A1 | 8/2006 | Lee et al. | |
| 2006/0182051 A1 | 8/2006 | Lee et al. | |
| 2008/0045224 A1 | 2/2008 | Lu et al. | |
| 2008/0212546 A1* | 9/2008 | Fischer | 370/338 |
| 2008/0233974 A1 | 9/2008 | Xu | |
| 2008/0291866 A1* | 11/2008 | Fukui | 370/328 |
| 2008/0316964 A1* | 12/2008 | Fischer | 370/329 |
| 2009/0010209 A1* | 1/2009 | Moon et al. | 370/328 |
| 2009/0310503 A1* | 12/2009 | Tenny et al. | 370/345 |
| 2010/0303023 A1* | 12/2010 | Nader | 370/329 |

OTHER PUBLICATIONS

3GPP Technical Specification TS 25.346, V6.12.0 Technical Specification Group Radio Access Network; Introduction of the Multimedia Broadcast Multicast Service (MBMS) in the Radio Access Network (RAN); Stage 2, Release 6, Sep. 2007.

3GPP Technical Specification TS 25.304, V6.1.0 Technical Specification Group Radio Access Network; User Equipment (UE) procedures in idle mode and procedures for cell reselection in connected mode, Release 6, Mar. 2004.

3GPP Technical Specification TS 25.211, V6.9.0 Technical Specification Group Radio Access Network; Physical channels and mapping of transport channels onto physical channels (FDD), Release 6, Nov. 2007.

PCT International Search Report, dated Aug. 26, 2010, in connection with International Application No. PCT/EP2010/057194.

PCT Written Opinion, dated Aug. 26, 2010, in connection with International Application No. PCT/EP2010/057194.

3GPP Technical Specification TS 25.304, V8.5.0 Technical Specification Group Radio Access Network; User Equipment (UE) procedures in idle mode and procedures for cell reselection in connected mode, Release 8, Mar. 2009.

3GPP Technical Specification TS 25.346, V8.3.0 Technical Specification Group Radio Access Network; Introduction of the Multimedia Broadcast Multicast Service (MBMS) in the Radio Access Network (RAN); Stage 2, Release 8, Mar. 2009.

3GPP Technical Specification TS 25.211, V8.4.0 Technical Specification Group Radio Access Network; Physical channels and mapping of transport channels onto physical channels (FDD), Release 8, Mar. 2009.

* cited by examiner

POWER-EFFICIENT ACCURATE MICH MONITORING IN A MOBILE COMMUNICATION SYSTEM

BACKGROUND

The present invention relates to methods and apparatuses for receiving changed service-related information conveyed by a signal that is transmitted by a network component of a mobile communication system.

The technology discussed herein relates generally to mobile communication systems. In a mobile communication system, User Equipment (UE) is capable of maintaining its communication service while moving throughout a geographical coverage area of the system. To enable this capability, the system's coverage area is provided with a number of geographically separated base stations that serve as the UE's portal to the mobile communication system. The UE always sends data to, and receives data from, the mobile communication system via a base station. In a typical system, the UE is connected in both the uplink and downlink directions to the base station having the most favorable radio conditions. The area covered by the base station is usually called a cell, and the cell to which the UE is connected is usually referred to as a serving cell.

To achieve compatibility and interoperability between UE's made by various manufacturers, as well as to avoid causing disturbing interference to unrelated devices, mobile communication systems typically need to comply with various standards and government regulations. A number of these are used and well-known in the art. To facilitate this discussion, terminology and network configurations that comply with the Universal Mobile Telecommunication System (UMTS) standard are used herein because these are known and will be readily understandable to the person of ordinary skill in the art. However, the use of this terminology and these configurations is done solely for the purpose of example rather than limitation. The various inventive aspects to be described in this document are equally applicable in many different mobile communications systems complying with different standards.

In the past, cellular systems have focused mainly on transmission of data intended for a single user. However, cellular networks have recently started to introduce additional services such as Multimedia Broadcast and Multicast Services (MBMS), which was introduced for Wideband Code Division Multiple Access (WCDMA) in Release 6. MBMS provides both point-to-point and point-to-multipoint multimedia services in which the same data (e.g., text, audio, picture, video) is transmitted from a single source to multiple users. An exemplary topology of such network is depicted in FIG. 1, in which the Broadcast/Multicast Service Center (BM-SC) serves as entry point for the services. A stream of data for the various services is provided by the BM-SC, and flows through a Gateway GPRS Support Node (GGSN) and Serving GPRS Support Node (SGSN) to a Radio Network Controller (RNC). Based either on a static configuration or on the number of UEs that are interested in receiving the service (derived by a procedure called counting), the RNC decides whether the service will be broadcast from a NodeB to multiple UEs as in Cell A of FIG. 1 (point-to-multipoint—"PTM") or whether the service will be sent to only one or a limited set of UEs by means of dedicated point-to-point (PTP) transmissions, as illustrated for Service X in Cell B, and also for Service Y in each of Cells B and C.

In MBMS-enabled UMTS systems, application data to be conveyed by means of a PTM transmission is carried on a logical channel called the MBMS Traffic Channel (MTCH). Control information (e.g., what services are currently available, in which mode (PTM or PTP) they are available and other configuration information) is broadcast on a logical channel called the MBMS Control Channel (MCCH). The MTCH and MCCH are both conveyed by means of a Secondary Common Control Physical Channel (S-CCPCH). Another physical channel, called the MBMS Indicator Channel (MICH), is used to convey information from the network to inform the UEs about the information changes on the MCCH. The MCCH and MICH are both conveyed as part of a radio frame, as illustrated in FIG. 2.

Looking at this mechanism in more detail, transmission on the MCCH follows a fixed schedule, as illustrated in FIG. 3. The MCCH information is transmitted using a variable number of consecutive Transmission Time Intervals (TTIs). In each of a number of modification periods, critical information remains unchanged and is periodically transmitted based on a repetition period. This means that a UE needs to receive only one of the multiple transmissions in each modification period to obtain the critical information conveyed during that modification period. To reduce UE power consumption and avoid having the UE constantly receive the MCCH, the MICH conveys information that informs UEs about upcoming changes in the critical MCCH information. In each 10 ms radio frame, 18, 36, 72, or 144 MBMS indicators (also called alarm indicators) can be transmitted, where a notification indicator is a single bit, transmitted using on-off keying and related to a specific group of services.

By relying on the MICH, UEs can sleep and briefly wake up at predefined time intervals to check whether a notification indicator has been transmitted. If the UE detects a notification indicator for a service of interest, it reads the MCCH during the next modification period to find the relevant control information. If no relevant notification indicator is detected, the UE may sleep until the next MICH occasion.

To illustrate the point, FIG. 3 illustrates three modification periods, denoted 1, 2, and 3. During Modification period 1, the MCCH is repeatedly transmitting control information (indicated by the single cross hatching). During that same modification period, the MICH is, in this example, transmitting a notification indicator informing that critical information on the MCCH will change during the next modification period. Accordingly, during modification period 2, the control information on MCCH is different from that which had previously been transmitted (as indicated by the crisscross hatching). If this pertains to a service of interest, a UE should read this information during one of the repeated transmissions.

Also during modification period 2, the MICH indicates that no change to critical information on the MCCH will be made for a service of interest during the next modification period. Accordingly, during modification period 3 the MCCH continues to repeatedly transmit the same information as had been transmitted during modification period 2. Since the UE knows that there is no new information to be obtained during modification period 3, it can refrain from reading the MCCH during modification period 3.

According to recommendations in the Third Generation Partnership Project (3GPP) specifications (TS 25.346 and 25.304) it is assumed that the modification period during which the network continuously transmits MICH frames with the same content will be long enough for the UE to be able to read notification indicators reliably during its regular discontinuous paging occasions (hereafter called "DRX cycle").

Further according to the 3GPP specifications (TS 25.304 and TS 25.211), when the UE wakes up during its DRX cycle and monitors the MICH, it has to monitor one 16-bit notification indicator (NI) for each MBMS service that it has subscribed to. This is a service that the UE is "interested in." In other words, for each service, a corresponding notification indicator will be set continuously through the entire length of the modification period preceding a change in the associated MCCH information. The specific value assigned to the 16 bits of the notification indicator is calculated as a function of the identity of the service (e.g., the Temporary Mobile Group Identity—"TMGI"—of the service). The specific mapping is given by the following:

$$NI = (TMGI + \lfloor TMGI/G \rfloor) \bmod G, \text{ where } G = 2^{16}.$$

The number of possible services outnumbers the number of notification indicators that can be transmitted in one MICH frame. Specifically, in 3GPP-compliant systems, each MICH frame contains 288 bits $\{b_0, \ldots, b_{287}\}$ which are logically partitioned into groups of 16, 8, 4, or 2 bits. This enables n 1-bit alarm indicators $\{A_0, \ldots, A_{n-1}\}$ to be mapped onto the MICH bits, where n=18, 36, 72, or 144.

The notification indicator is associated with an index q of the transmitted alarm indicator $A_q$, where q is computed as a function of the 16-bit notification indicator, the System Frame Number (SFN) of the Primary Common Control Physical Channel (P-CCPCH) radio frame during which the start of the MICH radio frame occurs, and the number of notification indicators per frame (n):

$$q = \left\lfloor ((C \times (NI \oplus ((C \times SFN) \bmod G))) \bmod G) \times \frac{n}{G} \right\rfloor$$

where $G=2^{16}$, $C=25033$.

The mapping from $\{A_0, \ldots, A_{n-1}\}$ to the MICH bits $\{b_0, \ldots, b_{287}\}$ in accordance with TS 25.211 is shown in the following table:

| Number of Alarms per frame (n) | $A_q = 1$ | $A_q = 0$ |
| --- | --- | --- |
| n = 18 | $\{b_{16q}, \ldots, b_{16q+15}\} = \{1, 1, \ldots, 1\}$ | $\{b_{16q}, \ldots, b_{16q+15}\} = \{0, 0, \ldots, 0\}$ |
| n = 36 | $\{b_{8q}, \ldots, b_{8q+7}\} = \{1, 1, \ldots, 1\}$ | $\{b_{8q}, \ldots, b_{8q+7}\} = \{0, 0, \ldots, 0\}$ |
| n = 72 | $\{b_{4q}, \ldots, b_{4q+3}\} = \{1, 1, 1, 1\}$ | $\{b_{4q}, \ldots, b_{4q+3}\} = \{0, 0, 0, 0\}$ |
| n = 144 | $\{b_{2q}, \ldots, b_{2q+1}\} = \{1, 1\}$ | $\{b_{2q}, \ldots, b_{2q+1}\} = \{0, 0\}$ |

In this mapping, a value of "$A_q=1$" indicates an upcoming change in the next modification period, whereas a value of "$A_q=0$" indicates that no changed data is to be transmitted in the next modification period.

It will be apparent that there is a non-unique mapping from a given service to the transmitted notification indicator; that is, more than one service's notification indicator can generate the same value for q, and consequently be mapped to the same transmitted MICH bits. Consequently, the transmitted MICH bits represent a logical "OR" of the corresponding notification indicators: if none of the notification indicators are asserted (indicating that there is no changed data in the next modification period), then the transmitted MICH bits for those indicators will be equal to "0".

However, if one or more of the corresponding notification indicators are asserted (indicating that there is changed data for that/those service(s) in the next modification period), then the transmitted MICH bits for all of the mapped notification indicators will be equal to "1". This means that for the mapped services that do not have changed data in the next modification period the transmitted bits are not accurate indicators of the actual notification indicators.

Consider the following example:

Assume that a UE operating in DRX mode is interested in one service (e.g., a TV Channel). The TV Channel has an identity, the "TMGI" which is used as the identity of the service between the network and the UE. Within an operator's network, three octets are available for uniquely identifying a service, giving the possibility of having as many as 16 million services. The TMGI is used in an equation to derive a 16-bit notification indicator. The notification indicator derived by higher layers of processing is typically provided to a lower Physical Layer. Note that the term Physical Layer is just exemplary and could be implemented in hardware and/or software. The Physical Layer in the UE is responsible for catching the MICH frames (10 ms) when the UE wakes up during a DRX cycle for other activities and checking whether a change indication is set somewhere within the frame. There are n possible places within this 10 ms frame where an alarm could be set for the TV Channel in this example. The Physical Layer uses the notification indicator in an equation to derive a value for q which gives, in the MICH frame, the positions (bits) of the alarm bit that is of interest for this TV Channel. Note that q depends on the SFN, so that the value of q (and hence the position of the alarm within the MICH frame) might change from one frame to another. If the alarm bits are set to 1, then the UE knows that something related to this TV Channel is to be changed in the next modification period and hence the UE has to wake up and read the MCCH channel during the next modification period.

A problem with the procedure described above is that within one MICH frame there can at most be 144 alarm bits. However, as described above, the range of TMGI (about 16 million theoretical possibilities) is far more than 144 services. Because the mapping algorithm does not result in unique mappings, the same alarm bit in the MICH frame could represent one or more services. In other words, the more services an operator introduces the more likely it is that the notification indicators within a frame will overlap in a same alarm bit. As a result, the UE interested in a certain service will suffer from false indications and read MCCH contents in vain although no change has been introduced for the service of interest. The most problematic consequence of this is the unnecessary waste of battery power in DRX mode in which the UE could instead be sleeping. Other problems (not limited to operation in DRX mode) are unnecessary activities affecting processing load, resource conflicts and the like.

It is therefore desirable to provide methods and apparatuses that provide power-efficient monitoring of the alarm bits.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses for controlling a user equipment to receive changed service-related information conveyed by a signal that is transmitted by a network component of a mobile communication system. In the environment in which the methods and apparatuses are employed, the mobile communication system provides a plurality of services to one or more user equipments, each service corresponding to a service identifier and being associated with corresponding service-related information. The signal comprises a plurality of sequentially occurring frames of an information change indicator channel. Each frame of the information change indicator channel comprises a plurality of information change indicators. Each of a plurality of sequentially occurring modification periods comprises a plurality of service-related information channel frames. Each modification period comprises a plurality of information change indicator channel frames. Assertion of an information change indicator during a present modification period indicates that service-related information to be transmitted during a next modification period is changed service-related information associated with at least one of the services. For each information change indicator frame, each of the plurality of services is mapped, by means of a mapping function, to an information change indicator within the frame of the information change indicator channel, wherein for each service identifier supplied as an input to the mapping function, the mapping function associates the corresponding service with an information change indicator within the frame of the information change indicator channel, wherein the mapping function is, at least in part, a function of the service identifier and a frame identifier, whereby the information change indicator with which a given service is associated can change from frame to frame, and whereby for any given frame of the information change indicator channel each of the information change indicators is characterized as a nonambiguous information change indicator if the information change indicator is associated with exactly one service and as an ambiguous information change indicator if the information change indicator is associated with more than one service.

Controlling the user equipment in some embodiments includes, during a present modification period, receiving a frame of the information change indicator channel. It is ascertained whether an information change indicator for a service of interest is an ambiguous information change indicator. If it is ascertained that the information change indicator for the service of interest is an ambiguous information change indicator, then mappings of all services that are not of interest are analyzed and results of the analysis are used to control whether or not to activate, in a next modification period, a receiver of the user equipment to receive information for the service of interest.

In some embodiments, analyzing mappings of all services that are not of interest and using results of said analysis to control whether or not to activate, in the next modification period, the receiver of the user equipment to receive information for the service of interest includes, for a threshold period of time within the present modification period, continuing to receive and process frames of the information change indicator channel to detect whether, in any of the frames of the information change indicator channel, there exists an unambiguous information change indicator for the service of interest and if the unambiguous information change indicator for the service of interest is detected and is asserted, then controlling the receiver of the user equipment to receive a frame of the service-related information channel during the next modification period and if the unambiguous information change indicator for the service of interest is detected and is not asserted, then controlling the receiver of the user equipment to not receive the frame of the service-related information channel during the next modification period. Upon expiration of the threshold period of time, if no unambiguous information change indicator for the service of interest has been found from among the frames of the information change indicator channel received during the present modification period, then further reading of information change indicator channel frames during the present modification period is halted, and the receiver of the user equipment is controlled to receive the frame of the service-related information channel during the next modification period.

In alternative embodiments, analyzing mappings of all services that are not of interest and using results of said analysis to control whether or not to activate, in the next modification period, the receiver of the user equipment to receive information for the service of interest includes applying the mapping function to all of the services to identify from among the present information change indicator channel frame and upcoming information change indicator channel frames within the present modification period, an information change indicator channel frame that includes a least ambiguous information change indicator for the service of interest. In this context, the least ambiguous information change indicator for the service of interest is an information change indicator that is associated with the service of interest and with a fewest number of other services not of interest. Reception of all upcoming information change indicator channel frames within the present modification period is inhibited except for the identified information change indicator channel frame. If the identified upcoming information change indicator channel frame is made available to the user equipment in an upcoming information change indicator channel frame, then the identified upcoming information change indicator channel frame that includes the least ambiguous information change indicator for the service of interest is received. Reception of the service-related information channel in the next modification period is controlled based on whether the received least ambiguous information change indicator for the service of interest is asserted.

In some cases, the fewest number of other services not of interest associated with the least ambiguous information change indicator is equal to zero.

In some embodiments, if more than one information change indicator channel frame that includes a least ambiguous information change indicator for the service of interest are found, then only that one of the information change indicator channel frames that includes a least ambiguous information change indicator for the service of interest whose reception is most compatible with other operations to be performed by the user equipment is received.

BRIEF DESCRIPTION OF THE DRAWINGS

The objects and advantages of the invention will be understood by reading the following detailed description in conjunction with the drawings in which.

DETAILED DESCRIPTION

Figure 1:
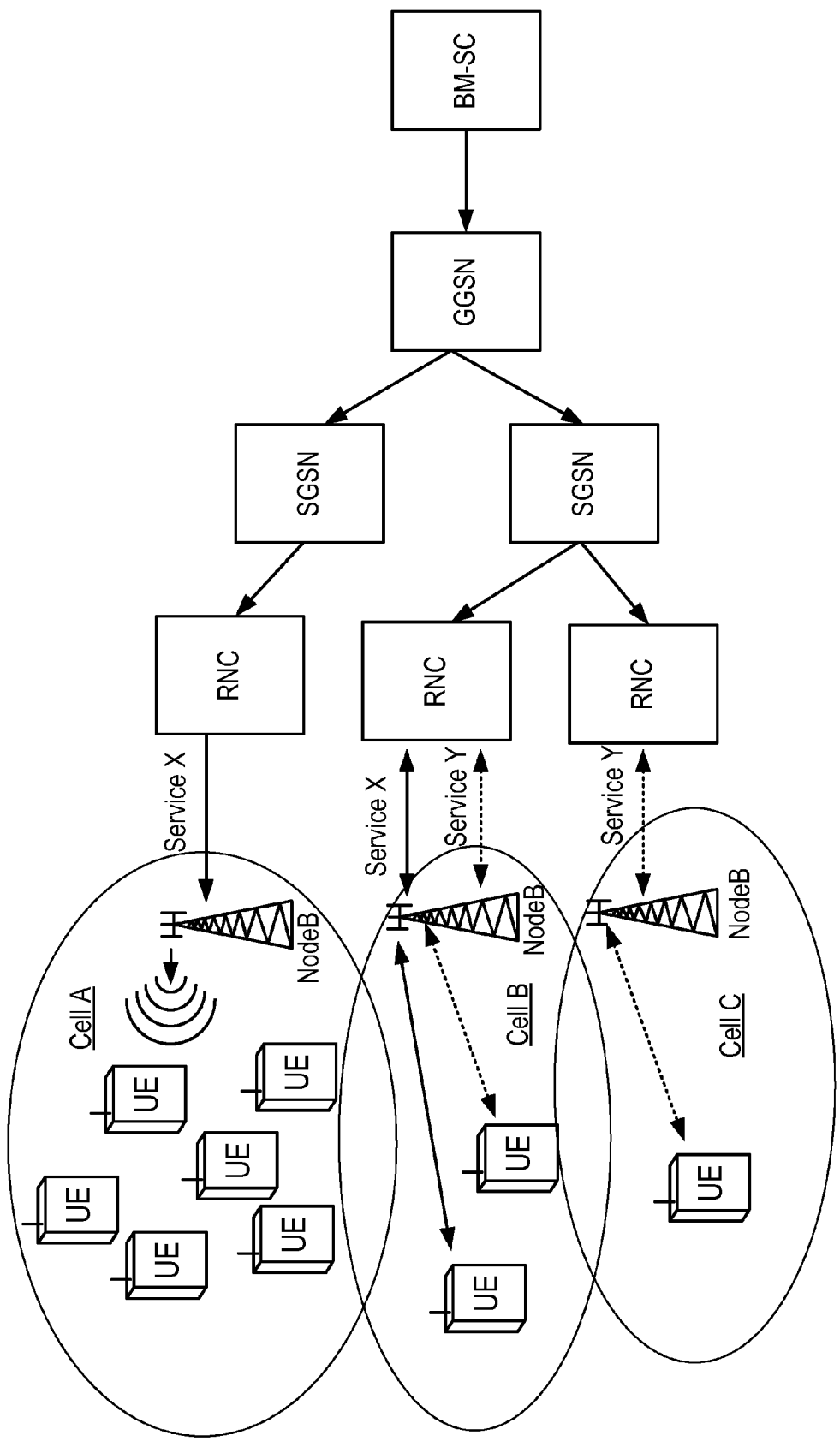
FIG. 1 illustrates an exemplary topology of a network in which MBMS has been deployed using both point-to-point and point-to-multipoint multimedia services.
Figure 2:
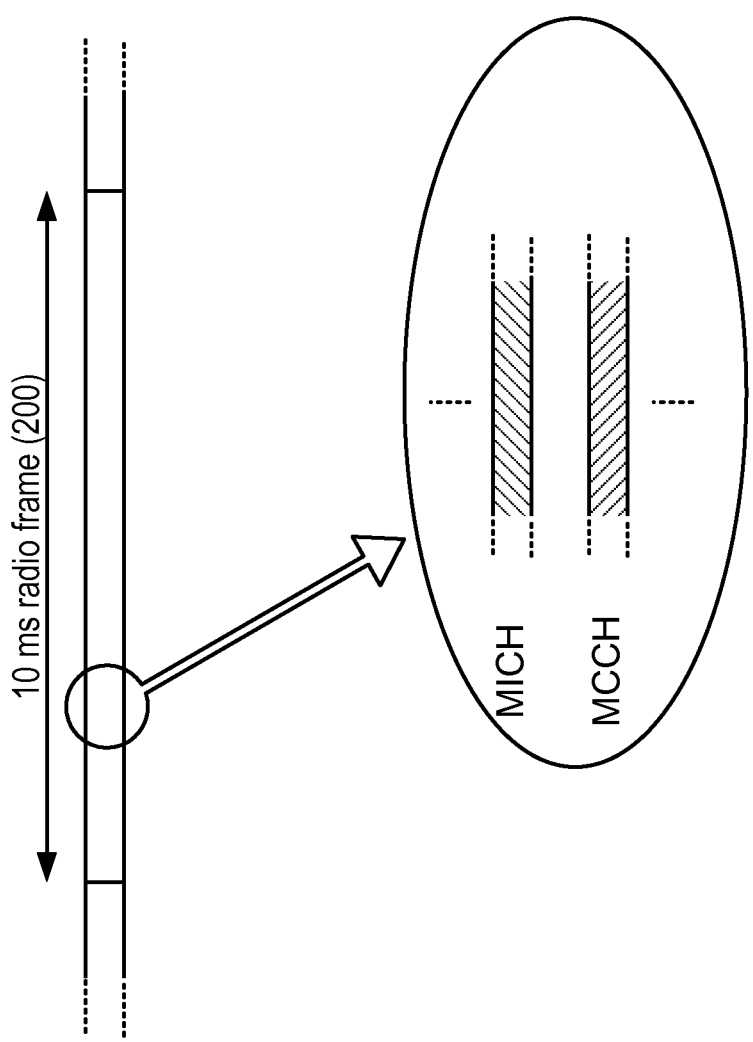
FIG. 2 is a signal diagram illustrating a radio frame that comprises an MCCH and a MICH.
Figure 3:
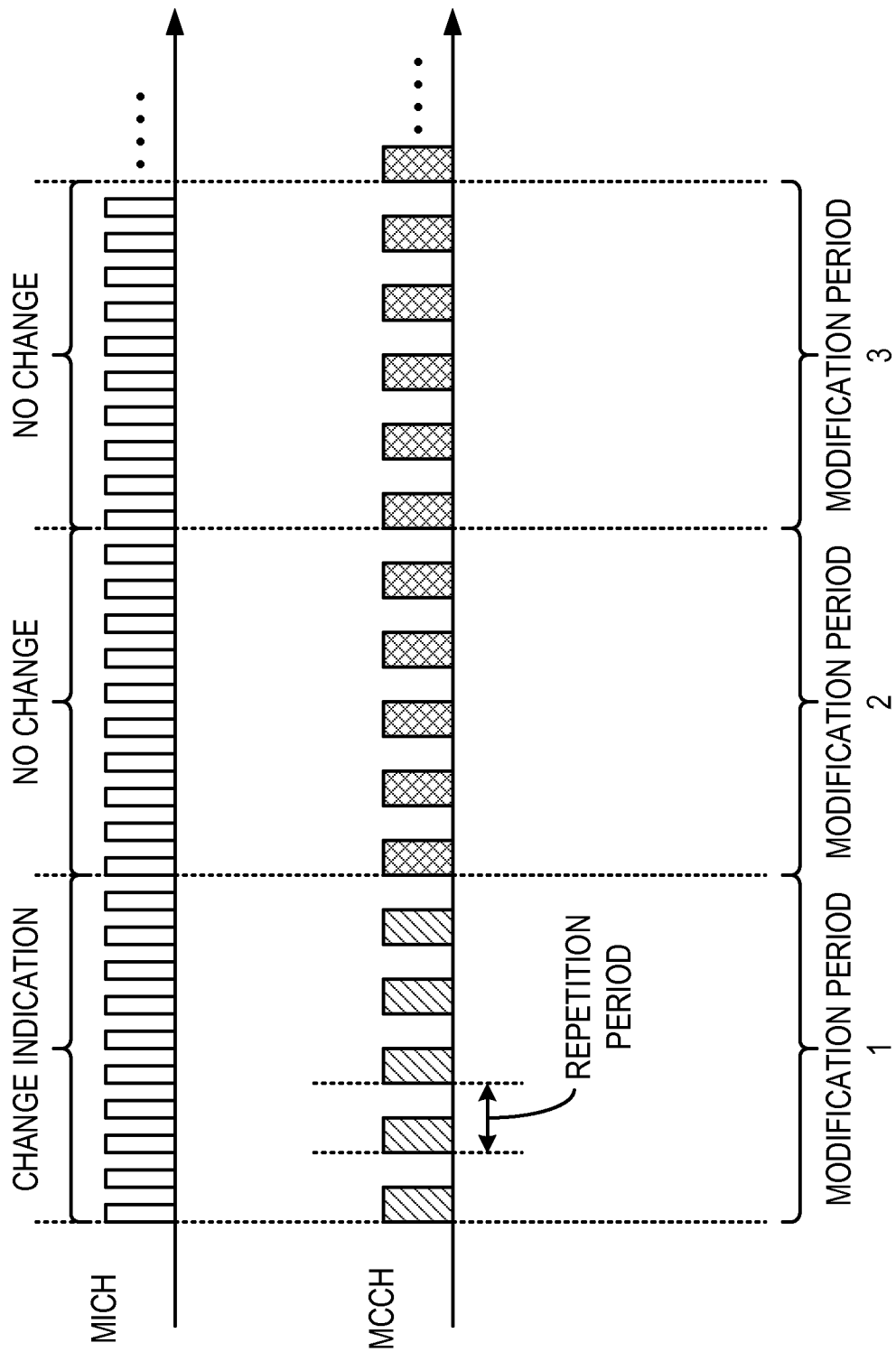
FIG. 3 is a timing diagram illustrating an exemplary scheduling of MCCH and MICH transmissions.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

An aspect of embodiments consistent with the invention is, after receiving a frame of an information change indicator channel (e.g., MICH) during a present modification period, it is ascertained whether an information change indicator (e.g., alarm bit) for a service of interest is an ambiguous information change indicator. In this context, an information change indicator is considered to be ambiguous if it is associated with more than one service. If it is ascertained that the information change indicator for the service of interest is an ambiguous information change indicator, then mappings of all services that are not of interest are analyzed. The results of the analysis are used to control whether or not to activate, in a next modification period, a receiver to receive information for the service of interest. This approach is used to reduce or eliminate the risk of false alarms leading to unnecessary activity (especially with respect to activating receiver circuitry).

In another aspect of embodiments consistent with the invention, efficient apparatuses and methods are provided for determining whether an information change indicator is ambiguous and for analyzing information about services not of interest to determine whether or not to activate the receiver to receive information for the service of interest in the next modification period.

These and other aspects are now described in further detail in the following.

Figure 4:
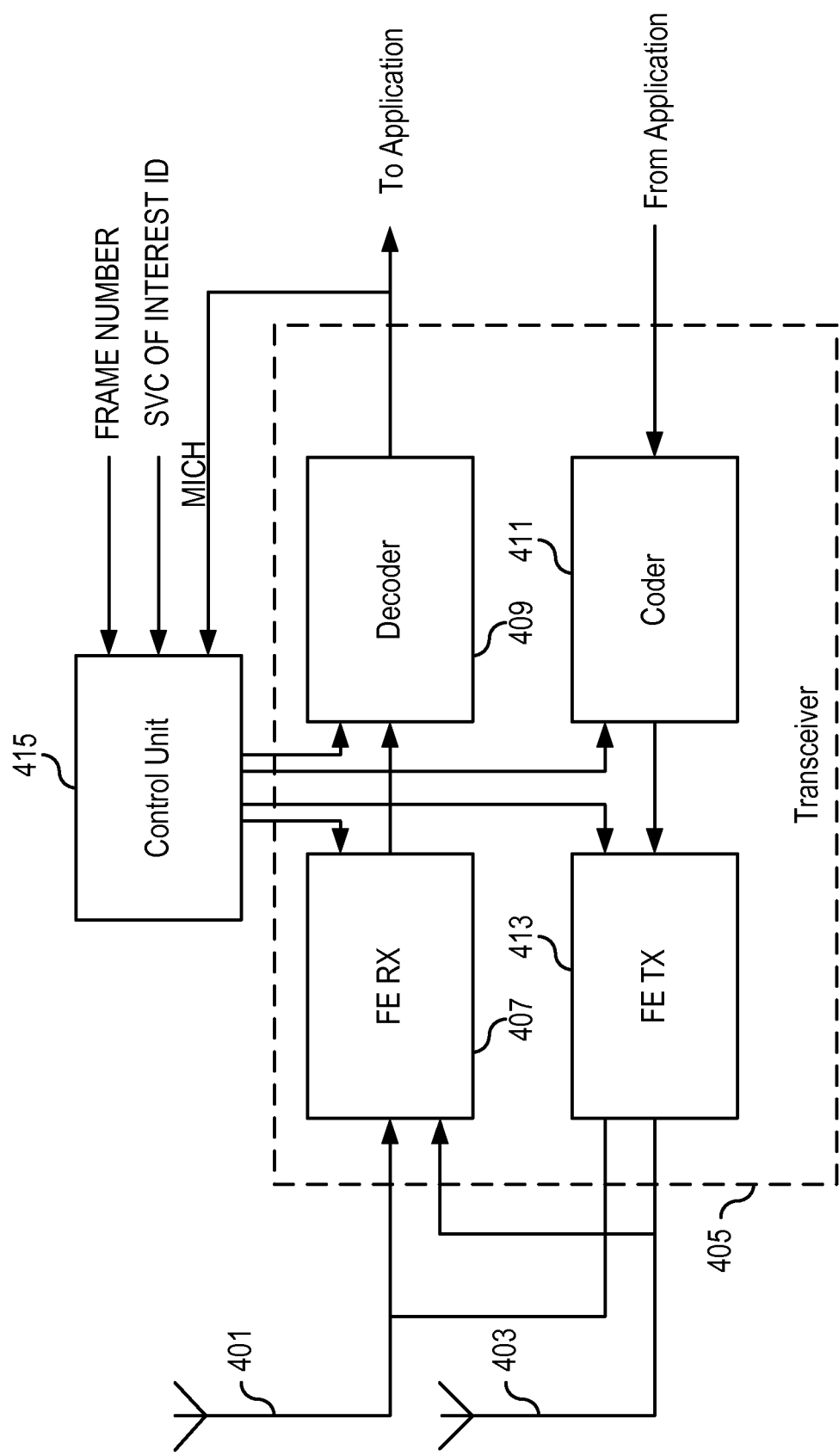
FIG. 4 is a block diagram of a user equipment having various circuitry configured to carry out functions in accordance with aspects of the invention.

FIG. 4 is a block diagram of a user equipment 400 having various circuitry configured to carry out functions in accordance with aspects of the invention. In this example, the user equipment 400 includes first and second antennas 401, 403, each of which is used for both transmission and reception of radio signals. Having more than one antenna allows the user equipment 400 to operate in a multiple input multiple output (MIMO) mode of operation, as is known in the art. However, this is not essential to the invention and other embodiments could involve only a single antenna or more than two antennas. Also, the number of antennas is not a determining factor of the user equipment functionality, nor does it restrict the scope of the invention. For example, due to cost limitations (e.g., the need for extra power amplifiers), it is often the case that a user equipment will be designed to operate with asymmetric receiver/transmit paths (e.g., two receive paths and only one transmit path).

Transceiver circuitry 405 in the user equipment 400 includes a receiver chain and a transmitter chain. The receiver chain comprises a front-end receiver 407 that receives radio signals from the first and second antennas 401, 403 and generates a baseband signal that is supplied to the decoder 409. The decoder 409 processes the received baseband signal and generates therefrom the data conveyed by the radio signal. This data is supplied to an application within the user equipment 400 for further processing. The nature of that further processing is beyond the scope of the invention.

The transmitter chain comprises a coder 411 and a front-end transmitter 413. Operation of the transmitter chain is essentially the reverse of that of the receiver chain. The coder 411 receives data from an application running within the user equipment 400 and formats the data in a manner that makes it suitable for transmission (e.g., by applying forward error correction coding and interleaving). The coded data, residing on a baseband signal, is supplied to the front-end transmitter 413 which converts the baseband signal into a modulated radiofrequency signal. The power of the modulated radiofrequency is set to a desired level and supplied to the first and second antennas 401, 403 for transmission. (In embodiments utilizing only one transmit path, the output signal is supplied to only a single one of the first and second antennas 401, 403.) Although, not illustrated in the figure, it will be understood that the user equipment 400 includes circuitry to ensure that signals to be transmitted do not appear on the input terminals of the front-end receiver 407.

The various blocks within the transceiver 405 operate in accordance with control signals that are generated by a control unit 415. In order to operate in accordance with aspects of the invention (described further below), the control unit 415 receives one or more signals that provide information about a present frame number, identifiers (IDs) of services of interest, and data received from the MICH channel in a present frame. Actions invoked by the control unit 415 are described in greater detail in the following discussion.

Figure 5:
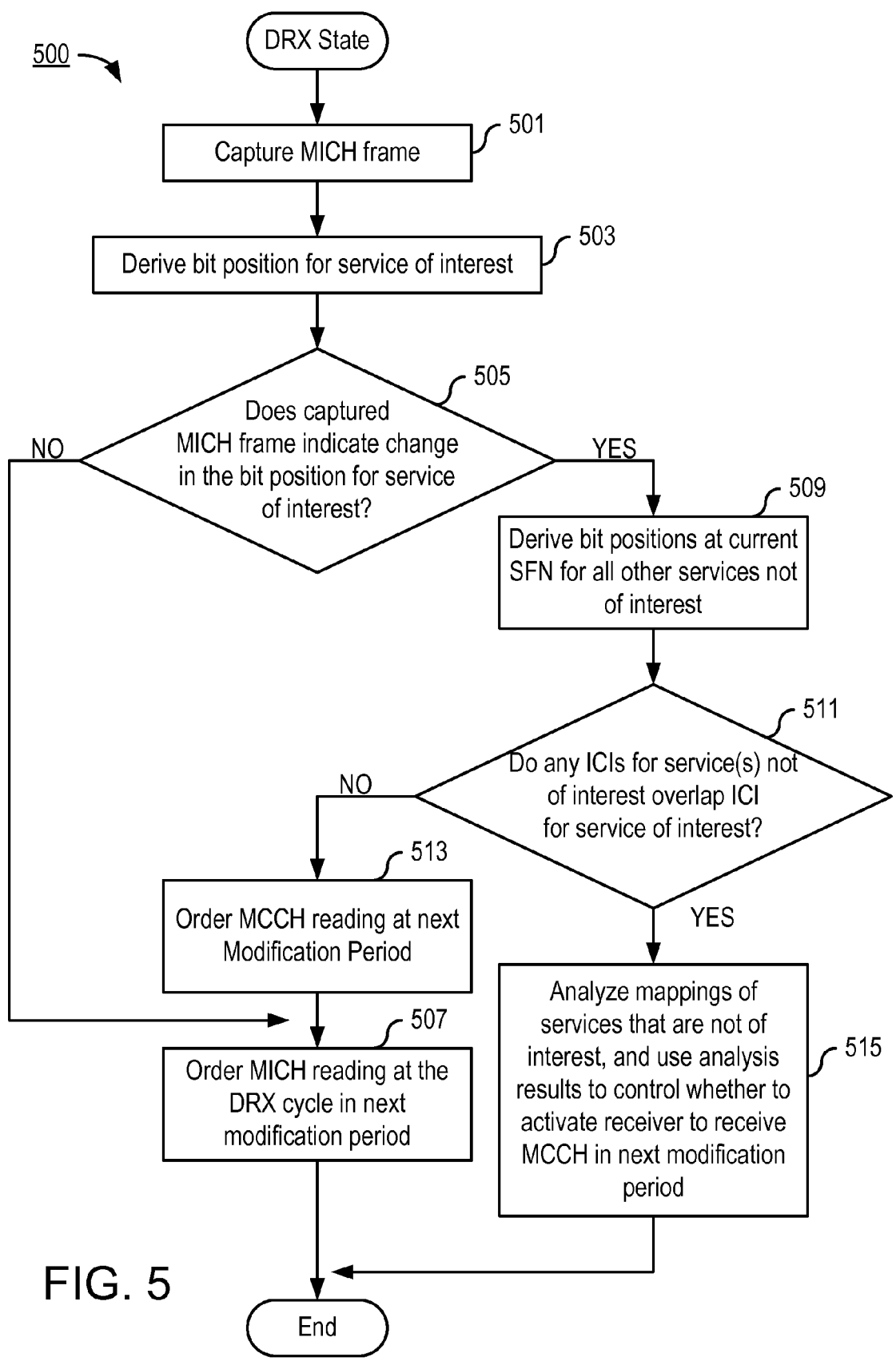
FIG. 5 is, in one respect, a flowchart of exemplary steps/processes carried out in accordance with aspects of the invention.

FIG. 5 is, in one respect, a flowchart of steps/processes carried out (e.g., by the control unit 415) in accordance with aspects of the invention. In another respect, FIG. 5 can be considered to be an apparatus 500 comprising the illustrated circuitry configured to perform the variously described functions.

In order to facilitate the reader's understanding of various aspects, this description assumes that the UE is interested in only a single service. However, those or ordinary skill in the art will readily be able to adapt the disclosed techniques for use in applications in which a UE is interested in more than one service at the same time.

It is further assumed in these examples that the various steps/processes are performed by an apparatus operating in DRX state, since this enables the various techniques to most serve the purpose of being efficient and power saving. However, operation in DRX state is not an essential aspect of the invention, and the various aspects of the invention can also be practiced in any other state. Such operation.

Upon entry into the DRX state, a request to read a MICH frame is ordered. Consequently, the apparatus 500 captures a MICH frame when it becomes available (step 501). The apparatus 500 then derives the notification indicator for the service of interest, and from this along with other parameters (e.g., SFN) the bit position for the service of interest (step 503). Those bit positions are then checked in the captured MICH frame to determine whether changed data for the service of interest will be transmitted during a next modification period (decision block 505). If not ("NO" path out of decision block 505), the apparatus 500 need do nothing further with respect to the service of interest during this modification period, and merely orders that a MICH frame be read at a DRX in the next modification period (step 507).

If the bit positions for the service of interest in the captured MICH frame indicate that changed data will be transmitted during a next modification period ("YES" path out of decision block 505), the apparatus 500 derives the bit positions at the current SFN for all other services that are not of interest (step 509). The purpose is to check whether the asserted bit(s) in the relevant bits of the captured MICH frame are a false alarm.

The apparatus 500 therefore compares the bit positions of services not of interest with the bit positions of the service of interest to test whether any of them overlap (decision block 511). If there is no overlap ("NO" path out of decision block 511) this means that the indicator is unambiguous (i.e., it is associated with exactly one service and is therefore a true indicator of whether changed data is expected to be transmitted during the next modification period). Therefore, the apparatus 500 orders that the MCCH be read during the next modification period to obtain the changed data for the service of interest (step 513). Then, as a setup for the next DRX cycle, the apparatus 500 orders that a MICH frame be read at a DRX in the next modification period (step 507).

If there is overlap between the bit positions of the service of interest and bit positions of one or more services not of interest ("YES" path out of decision block 511) then the alarm bits are considered to be ambiguous—they may or may not be indicating that changed data will be transmitted for the service of interest. Rather than merely ordering that the MCCH be read during the next modification period, the apparatus 500 analyzes mappings of services that are not of interest, and uses analysis results to control whether to activate the receiver to receive the MCCH in the next modification (step 515). The goal of the analysis is to attempt to resolve the ambiguity, and thereby to possibly avoid unnecessarily reading the MCCH in the next modification period.

Using an analysis of mappings of services that are not of interest to control whether to activate the receiver to receive the MCCH in the next modification period can be done in a number of ways. The strategy employed in a first approach is to keep the radio turned on and continue to capture and process MICH frames in the hope of ruling out false alarms. However, if subsequent MICH frames still do not achieve this purpose, the radio resources should only be kept on for a certain amount of time (or number of frames) before giving up and deciding to read the MCCH in the next modification period. This strategy is useful in embodiments in which it is more advantageous, in terms of power consumption, to keep the radio blocks of the UE turned on after the DRX wake-up occurrence.

Figure 6:
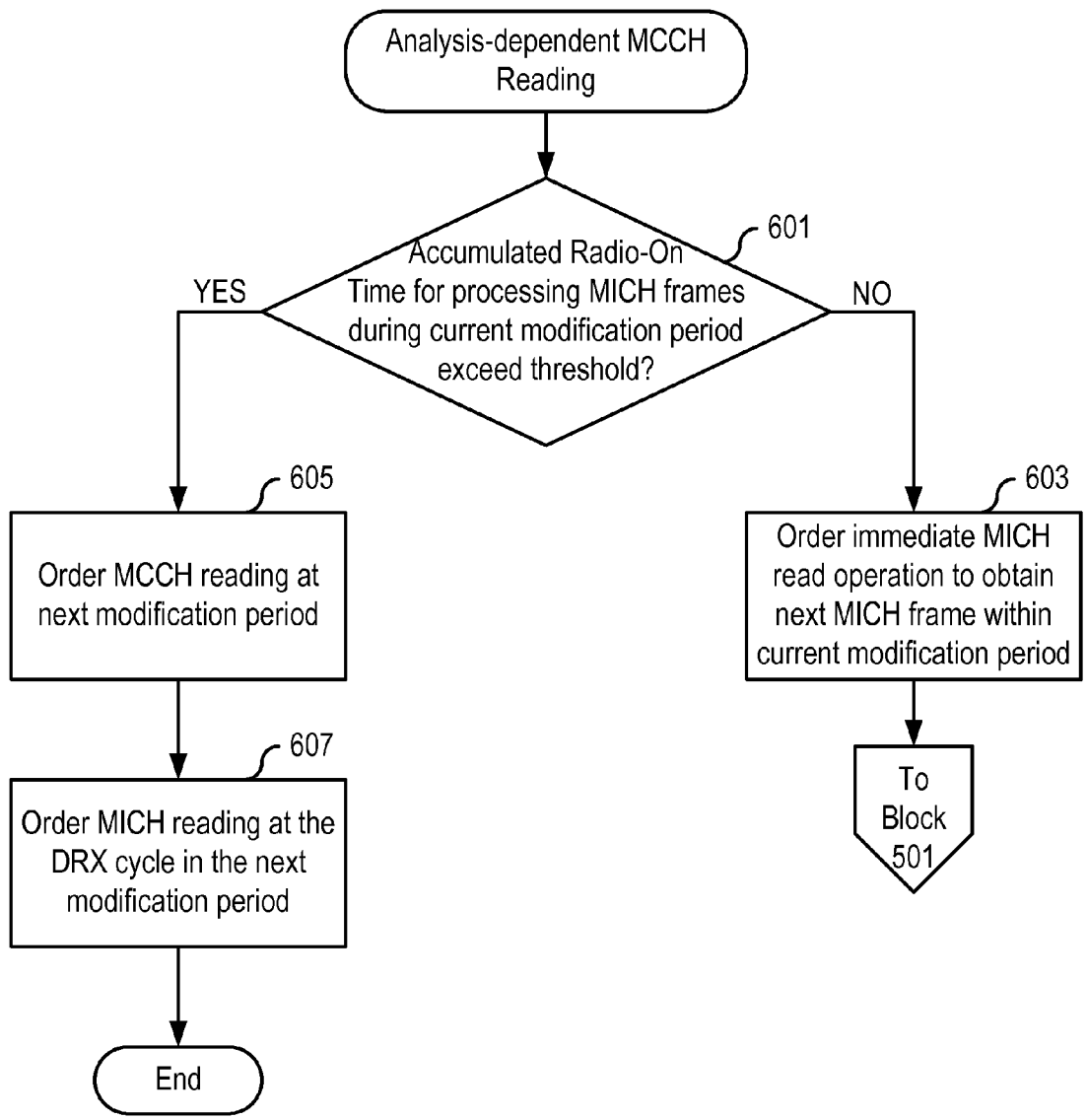
FIG. 6 is, in one respect, a flowchart of steps/processes carried out in an apparatus in accordance with aspects of an exemplary embodiment of the invention.

An exemplary embodiment following this first approach is illustrated in FIG. 6, which is, in one respect, a flowchart of steps/processes carried out in an apparatus (e.g., the control unit 415) in accordance with aspects of the invention. In another respect, FIG. 6 can be considered to be an apparatus 600 comprising the illustrated circuitry configured to perform the variously described functions.

Upon entry into the routine, a MICH frame has already been read and the alarm bit for the service of interest has been determined to be ambiguous. Therefore, a test is performed to determine whether an accumulated radio-on time for processing MICH frames during the current modification period exceeds a threshold time duration (decision block 601). If not ("NO" path out of decision block 601), another MICH read operation is ordered to occur within the current DRX wake-up state and current modification period (step 603). Processing then reverts back to step 501 (see FIG. 5). Although the next MICH read operation will occur within the same modification period, the next MICH frame will be associated with a different SFN. Consequently, there is a chance that the alarm bit for the service of interest will be unambiguous in this next MICH frame. Accordingly, the strategy exemplified by FIG. 5 is again employed, possibly with a return to step 601 if the ambiguity continues to exist even in the next MICH frame.

This process can be repeated any number of times until it is detected that the accumulated radio-on time for processing MICH frames during the current modification period has exceeded the threshold time duration ("YES" path out of decision block 601). The threshold time duration is set to avoid spending more energy trying to resolve the ambiguity than would be required to simply read the next MCCH data even if no data has been changed since the last MCCH read operation. Accordingly, an MCCH read operation is ordered to take place during the next modification period (step 605) so that if there is any changed data, it will be captured.

Additionally, a MICH read operation is ordered to take place during the next DRX cycle in the next modification period to repeat the process (e.g., beginning with entry into the logic illustrated by FIG. 5).

An alternative strategy for using an analysis of mappings of services that are not of interest to control whether to activate the receiver to receive the MCCH in the next modification period is useful in embodiments having efficient radio blocks whose receiver circuitry can be turned on and off without adding a lot of overhead (and hence power consumption) during each wake-up period. Specifically, the idea is to apply the mapping function to all of the services to identify from among the present MICH frame information as well as upcoming MICH frames within the present modification period, which one of the MICH frames includes a least ambiguous alarm bit for the service of interest. In this context, the least ambiguous alarm bit for the service of interest is an alarm bit that is associated with the service of interest and with a fewest number of other services not of interest. In the best case, this approach is able to identify which of the upcoming MICH frames within the current modification period has an unambiguous alarm bit for the service of interest. If one can't be found, then a MICH frame that is associated with the service of interest and with the fewest number of services not of interest is identified. Reading this frame at least reduces the likelihood that the alarm bit is a false indicator. Once a frame number has been derived with a zero or reduced risk, a MICH read operation is ordered only for the identified frame; the radio receiver is otherwise kept off during other frames.

Figure 7A:
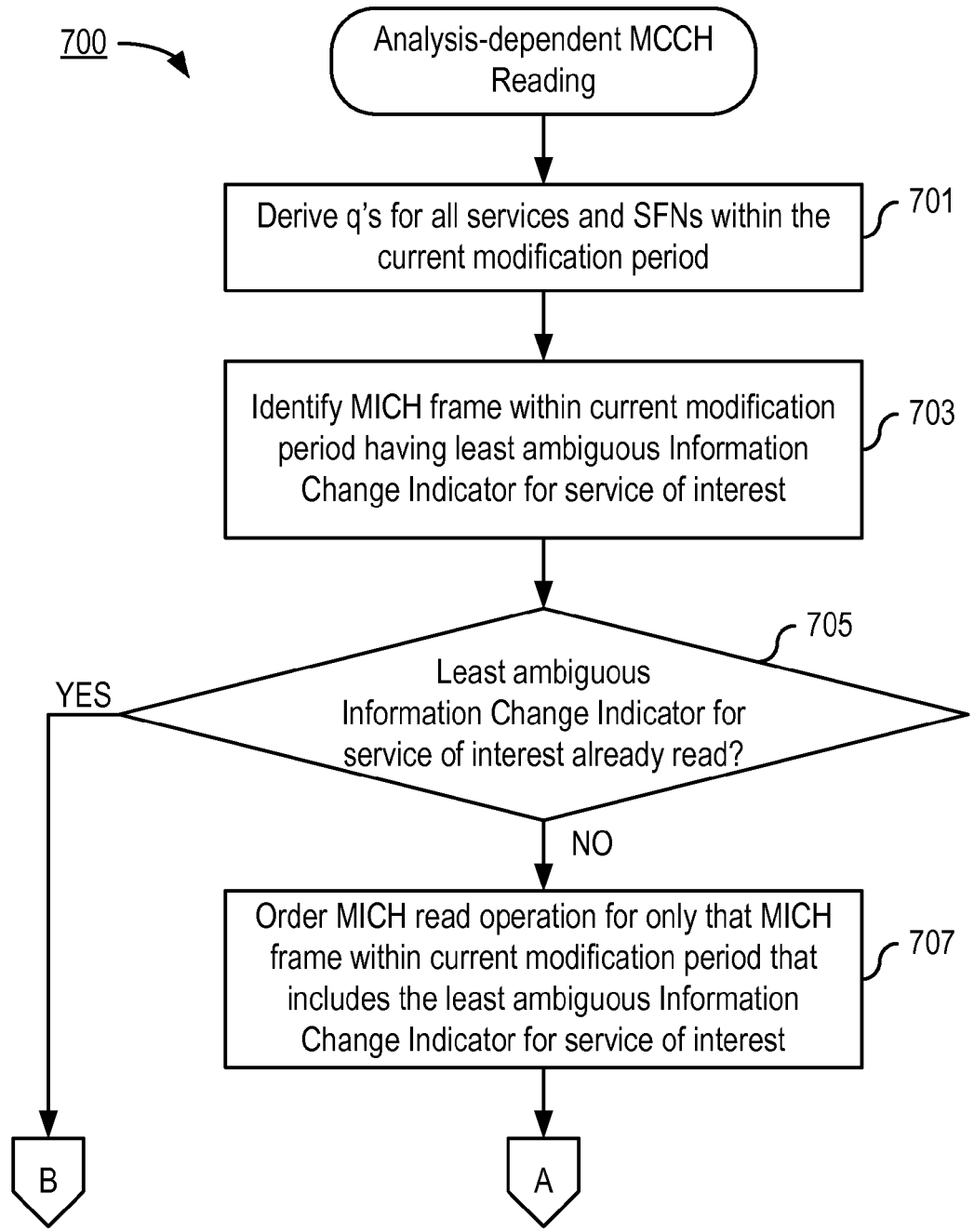
FIGS. 7a and 7b together are, in one respect, a flowchart of exemplary steps/processes carried out in an apparatus in accordance with aspects of an alternative embodiment of the invention.
Figure 7B:
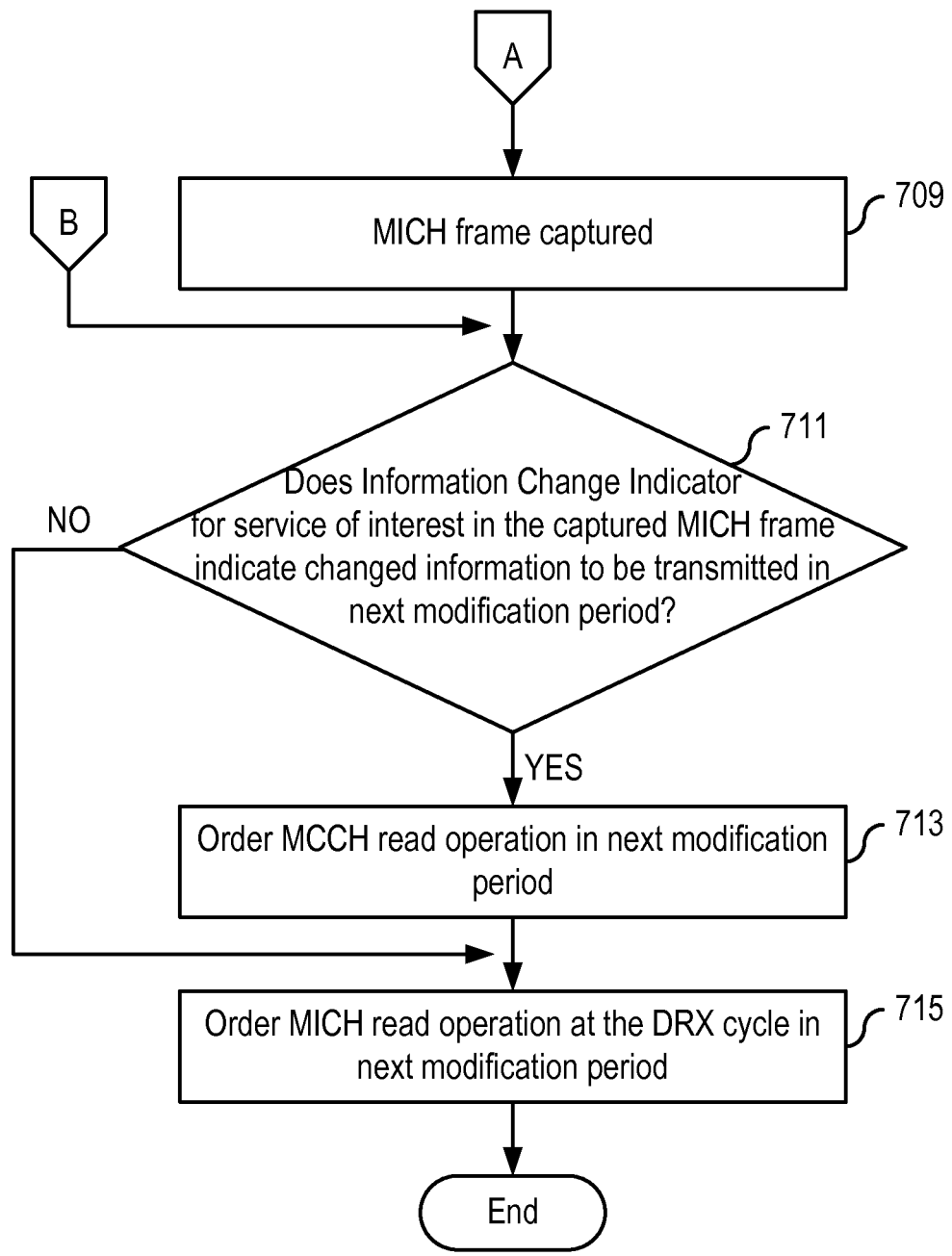

An exemplary embodiment following this second approach is illustrated in FIGS. 7*a* and 7*b*, which together are, in one respect, a flowchart of steps/processes carried out in an apparatus (e.g., the control unit 415) in accordance with aspects of the invention. In another respect, FIGS. 7a and 7b can together be considered to be an apparatus 700 comprising the illustrated circuitry configured to perform the variously described functions.

Upon entry into the routine, it has been determined that an alarm bit for a service of interest is ambiguous (see "YES" path out of decision block 511). In order to find the least ambiguous alarm bit for the service of interest from among all of the MICH frames that can be read within the current modification period, the mappings of not only the service of interest but also of all services are derived for all SFNs occurring within the current modification period (step 701). This enables the amount of overlap to be determined for not only the current (already-obtained) MICH frame, but for all others that can be received within the current modification period. From this information, the apparatus 700 identifies the MICH frame within the current modification period having the least ambiguous alarm bit for the service of interest (step 703). As mentioned earlier, in the best case "least ambiguous" means "nonambiguous"—an alarm bit that uniquely corresponds to only the service of interest has been found in an upcoming MICH frame within the current modification period. However, this need not be the case, and "least ambiguous" on other instances merely means the alarm bit for the service of interest that is shared by the fewest number of services that are not of interest.

It may be the case that the least ambiguous alarm bit is found within the MICH frame that has already been read (see step 501 in FIG. 5). Therefore, a test for this possibility is made (decision block 705). If the least ambiguous alarm bit has not already been read ("NO" path out of decision block 705) then a MICH read operation is ordered for only that MICH frame within the current modification period that includes the least ambiguous alarm bit for the service of interest (step 707). The receiver circuitry is otherwise not operated to receive other MICH frames within the current modification period.

When the MICH frame containing the least ambiguous alarm bit is transmitted by the mobile communication network, it is captured by the receiver (step 709). The alarm bit within the captured MICH frame for the service of interest is then tested to determine whether it indicates that changed information will be transmitted on the MCCH during the next modification period (decision block 711). If so ("YES" path out of decision block 711), a MCCH read operation is ordered to take place in the next modification period (step 713). If no changed information is indicated by the alarm bit for the service of interest ("NO" path out of decision block 711) this step is skipped. In either case, a MICH read operation is ordered to take place at the next wake-up time in the next DRX cycle in the next modification period (step 715).

Returning to a consideration of decision block 705, if the least ambiguous alarm bit for the service of interest was already captured in the present MICH frame ("YES" path out of decision block 705), there is no need to order another MICH read during the current modification period. Accordingly, processing skips down to decision block 711, which operates as described above.

In yet other alternatives, the two strategies discussed above with respect to FIGS. 6, 7a and 7b can be used concurrently or be integrated into a single strategy (e.g., the second strategy incorporating a radio usage threshold as used in the first strategy).

As mentioned earlier, terminology and system architectures associated with the known WCDMA system have been used in the description as a way of facilitating the user's understanding of various aspects of embodiments consistent with the invention. However, it will be appreciated that the various inventive aspects are not limited to application in a WCDMA system. Thus for example, references to a MCCH can more generally be thought of as a service-related information channel; a MICH channel can more generally be thought of as an information change indicator channel; and frames of alarm bits on the MICH channel can more generally be thought of as a frames each comprising a plurality of information change indicators.

Utilization of any of the embodiments enables a UE or other communication equipment to avoid unnecessary activities (e.g., reading a service-related information channel to obtain the same information obtained at an earlier time) as a result of false alarms when an alarm bit indicating the presence of new information is ambiguous as to the particular service to which it pertains. This can lead to substantial savings in power consumption and also reduces processing load, resource conflicts, and the like.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of controlling a user equipment to receive changed service-related information conveyed by a signal that is transmitted by a network component of a mobile communication system, wherein:

the mobile communication system provides a plurality of services to one or more user equipments, each service corresponding to a service identifier and being associated with corresponding service-related information;

the signal comprises a plurality of sequentially occurring frames of an information change indicator channel;

each frame of the information change indicator channel comprises a plurality of information change indicators;

each of a plurality of sequentially occurring modification periods comprises a plurality of service-related information channel frames;

each modification period comprises a plurality of information change indicator channel frames;

assertion of an information change indicator during a present modification period indicates that service-related information to be transmitted during a next modification period is changed service-related information associated with at least one of the services;

for each information change indicator frame, each of the plurality of services is mapped, by means of a mapping function, to an information change indicator within the frame of the information change indicator channel, wherein for each service identifier supplied as an input to the mapping function, the mapping function associates the corresponding service with an information change indicator within the frame of the information change indicator channel, wherein the mapping function is, at least in part, a function of the service identifier and a frame identifier, whereby the information change indicator with which a given service is associated can change from frame to frame, and whereby for any given frame of the information change indicator channel each of the information change indicators is characterized as a nonambiguous information change indicator if the information change indicator is associated with exactly one service and as an ambiguous information change indicator if the information change indicator is associated with more than one service, the method of controlling the user equipment comprising:

during a present modification period, receiving a frame of the information change indicator channel;

ascertaining whether an information change indicator for a service of interest is an ambiguous information change indicator; and in response to ascertaining that the information change indicator for the service of interest is an ambiguous information change indicator, then analyzing mappings of all services that are not of interest and using results of said analyzing to control whether or not to activate, in a next modification period, a receiver of the user equipment to receive information for the service of interest, wherein analyzing mappings of all services that are not of interest and using results of said analyzing to control whether or not to activate, in the next modification period, the receiver of the user equipment to receive information for the service of interest comprises applying the mapping function to all of the services to identify from among the present information change indicator channel frame and upcoming information change indicator channel frames within the present modification period, an information change indicator channel frame that includes a least ambiguous information change indicator for the service of interest, wherein the least ambiguous information change indicator for the service of interest is an information change indicator that is associated with the service of interest and with a fewest number of other services not of interest; and the method further comprises, if more than one information change indicator channel frame that includes a least ambiguous information change indicator for the service of interest are found, then receiving only that one of the information change indicator channel frames that includes a least ambiguous information change indicator for the service of interest whose reception is most compatible with other operations to be performed by the user equipment.

2. The method of claim 1, wherein analyzing mappings of all services that are not of interest and using results of said analyzing to control whether or not to activate, in the next modification period, the receiver of the user equipment to receive information for the service of interest comprises:

for a threshold period of time within the present modification period, continuing to receive and process frames of the information change indicator channel to detect whether, in any of the frames of the information change indicator channel, there exists an unambiguous information change indicator for the service of interest and if the unambiguous information change indicator for the service of interest is detected and is asserted, then controlling the receiver of the user equipment to receive a frame of the service-related information channel during the next modification period and if the unambiguous information change indicator for the service of interest is detected and is not asserted, then controlling the receiver of the user equipment to not receive the frame of the service-related information channel during the next modification period; and upon expiration of the threshold period of time, if no unambiguous information change indicator for the service of interest has been found from among the frames of the information change indicator channel received during the present modification period, then halting further reading of information change indicator channel frames during the present modification period and controlling the receiver of the user equipment to receive the frame of the service-related information channel during the next modification period.

3. The method of claim 1, wherein analyzing mappings of all services that are not of interest and using results of said analyzing to control whether or not to activate, in the next modification period, the receiver of the user equipment to receive information for the service of interest further comprises:

inhibiting reception of all upcoming information change indicator channel frames within the present modification period except for the identified information change indicator channel frame; and if the identified upcoming information change indicator channel frame is made available to the user equipment in an upcoming information change indicator channel frame, then receiving the identified upcoming information change indicator channel frame that includes the least ambiguous information change indicator for the service of interest; and controlling reception of the service-related information channel in the next modification period based on whether the received least ambiguous information change indicator for the service of interest is asserted.

4. The method of claim 3, wherein the fewest number of other services not of interest associated with the least ambiguous information change indicator is equal to zero.

5. A method of controlling a user equipment to receive changed service-related information conveyed by a signal that is transmitted by a network component of a mobile communication system, wherein:

the mobile communication system provides a plurality of services to one or more user equipments, each service corresponding to a service identifier and being associated with corresponding service-related information;

the signal comprises a plurality of sequentially occurring frames of an information change indicator channel;

each frame of the information change indicator channel comprises a plurality of information change indicators;

each of a plurality of sequentially occurring modification periods comprises a plurality of service-related information channel frames;

each modification period comprises a plurality of information change indicator channel frames;

assertion of an information change indicator during a present modification period indicates that service-related information to be transmitted during a next modification period is changed service-related information associated with at least one of the services;

for each information change indicator frame, each of the plurality of services is mapped, by means of a mapping function, to an information change indicator within the frame of the information change indicator channel, wherein for each service identifier supplied as an input to the mapping function, the mapping function associates the corresponding service with an information change indicator within the frame of the information change indicator channel, wherein the mapping function is, at least in part, a function of the service identifier and a frame identifier, whereby the information change indicator with which a given service is associated can change from frame to frame, and whereby for any given frame of the information change indicator channel each of the information change indicators is characterized as a nonambiguous information change indicator if the information change indicator is associated with exactly one service and as an ambiguous information change indicator if the information change indicator is associated with more than one service, the method of controlling the user equipment comprising:

applying the mapping function to all of the services to identify from among upcoming information change indicator channel frames within the present modification period, an information change indicator channel frame that includes a least ambiguous information change indicator for a service of interest, wherein the least ambiguous information change indicator for the service of interest is an information change indicator that is associated with the service of interest and with a fewest number of other services not of interest;

inhibiting reception of all upcoming information change indicator channel frames within the present modification period except for the identified information change indicator channel frame;

receiving the identified upcoming information change indicator channel frame that includes the least ambiguous information change indicator for the service of interest;

controlling reception of the service-related information channel in the next modification period based on whether the received least ambiguous information change indicator for the service of interest is asserted; and if more than one information change indicator channel frame that includes a least ambiguous information change indicator for the service of interest are found, then receiving only that one of the information change indicator channel frames that includes a least ambiguous information change indicator for the service of interest whose reception is most compatible with other operations to be performed by the user equipment.

6. The method of claim 5, wherein the fewest number of other services not of interest associated with the least ambiguous information change indicator is equal to zero.

7. An apparatus for controlling a user equipment to receive changed service-related information conveyed by a signal that is transmitted by a network component of a mobile communication system, wherein:

the mobile communication system provides a plurality of services to one or more user equipments, each service corresponding to a service identifier and being associated with corresponding service-related information;

the signal comprises a plurality of sequentially occurring frames of an information change indicator channel;

each frame of the information change indicator channel comprises a plurality of information change indicators;

each of a plurality of sequentially occurring modification periods comprises a plurality of service-related information channel frames;

each modification period comprises a plurality of information change indicator channel frames;

assertion of an information change indicator during a present modification period indicates that service-related information to be transmitted during a next modification period is changed service-related information associated with at least one of the services;

for each information change indicator frame, each of the plurality of services is mapped, by means of a mapping function, to an information change indicator within the frame of the information change indicator channel, wherein for each service identifier supplied as an input to the mapping function, the mapping function associates the corresponding service with an information change indicator within the frame of the information change indicator channel, wherein the mapping function is, at least in part, a function of the service identifier and a frame identifier, whereby the information change indicator with which a given service is associated can change from frame to frame, and whereby for any given frame of the information change indicator channel each of the information change indicators is characterized as a nonambiguous information change indicator if the information change indicator is associated with exactly one service and as an ambiguous information change indicator if the information change indicator is associated with more than one service, the apparatus for controlling the user equipment comprising:

circuitry configured to receiving a frame of the information change indicator channel during a present modification period;

circuitry configured to ascertain whether an information change indicator for a service of interest is an ambiguous information change indicator; and circuitry configured to respond to ascertaining that the information change indicator for the service of interest is an ambiguous information change indicator by analyzing mappings of all services that are not of interest and using results of said analyzing to control whether or not to activate, in a next modification period, a receiver of the user equipment to receive information for the service of interest, wherein the circuitry configured to respond to ascertaining that the information change indicator for the service of interest is an ambiguous information change indicator by analyzing mappings of all services that are not of interest and using results of said analyzing to control whether or not to activate, in the next modification period, the receiver of the user equipment to receive information for the service of interest comprises circuitry configured to apply the mapping function to all of the services to identify from among the present information change indicator channel frame and upcoming information change indicator channel frames within the present modification period, an information change indicator channel frame that includes a least ambiguous information change indicator for the service of interest, wherein the least ambiguous information change indicator for the service of interest is an information change indicator that is associated with the service of interest and with a fewest number of other services not of interest; and the apparatus further comprises circuitry configured to receive only that one of the information change indicator channel frames that includes a least ambiguous information change indicator for the service of interest whose reception is most compatible with other operations to be performed by the user equipment in response to more than one information change indicator channel frame that includes a least ambiguous information change indicator for the service of interest being found.

8. The apparatus of claim 7, wherein the circuitry configured to respond to ascertaining that the information change indicator for the service of interest is an ambiguous information change indicator by analyzing mappings of all services that are not of interest and using results of said analyzing to control whether or not to activate, in the next modification period, the receiver of the user equipment to receive information for the service of interest comprises:

circuitry configured to perform, for a threshold period of time within the present modification period, continuing to receive and process frames of the information change indicator channel to detect whether, in any of the frames of the information change indicator channel, there exists an unambiguous information change indicator for the service of interest and if the unambiguous information change indicator for the service of interest is detected and is asserted, then controlling the receiver of the user equipment to receive a frame of the service-related information channel during the next modification period and if the unambiguous information change indicator for the service of interest is detected and is not asserted, then controlling the receiver of the user equipment to not receive the frame of the service-related information channel during the next modification period; and circuitry configured to perform, upon expiration of the threshold period of time and if no unambiguous information change indicator for the service of interest has been found from among the frames of the information change indicator channel received during the present modification period, halting further reading of information change indicator channel frames during the present modification period and controlling the receiver of the user equipment to receive the frame of the service-related information channel during the next modification period.

9. The apparatus of claim 7, wherein the circuitry configured to respond to ascertaining that the information change indicator for the service of interest is an ambiguous information change indicator by analyzing mappings of all services that are not of interest and using results of said analyzing to control whether or not to activate, in the next modification period, the receiver of the user equipment to receive information for the service of interest further comprises:

circuitry configured to inhibit reception of all upcoming information change indicator channel frames within the present modification period except for the identified information change indicator channel frame; and circuitry configured to receive the identified upcoming information change indicator channel frame that includes the least ambiguous information change indicator for the service of interest in response to the identified upcoming information change indicator channel frame being made available to the user equipment in an upcoming information change indicator channel frame; and circuitry configured to control reception of the service-related information channel in the next modification period based on whether the received least ambiguous information change indicator for the service of interest is asserted.

10. The apparatus of claim 9, wherein the fewest number of other services not of interest associated with the least ambiguous information change indicator is equal to zero.

11. An apparatus for controlling a user equipment to receive changed service-related information conveyed by a signal that is transmitted by a network component of a mobile communication system, wherein:

the mobile communication system provides a plurality of services to one or more user equipments, each service corresponding to a service identifier and being associated with corresponding service-related information;

the signal comprises a plurality of sequentially occurring frames of an information change indicator channel;

each frame of the information change indicator channel comprises a plurality of information change indicators;

each of a plurality of sequentially occurring modification periods comprises a plurality of service-related information channel frames;

each modification period comprises a plurality of information change indicator channel frames;

assertion of an information change indicator during a present modification period indicates that service-related information to be transmitted during a next modification period is changed service-related information associated with at least one of the services;

for each information change indicator frame, each of the plurality of services is mapped, by means of a mapping function, to an information change indicator within the frame of the information change indicator channel, wherein for each service identifier supplied as an input to the mapping function, the mapping function associates the corresponding service with an information change indicator within the frame of the information change indicator channel, wherein the mapping function is, at least in part, a function of the service identifier and a frame identifier, whereby the information change indicator with which a given service is associated can change from frame to frame, and whereby for any given frame of the information change indicator channel each of the information change indicators is characterized as a nonambiguous information change indicator if the information change indicator is associated with exactly one service and as an ambiguous information change indicator if the information change indicator is associated with more than one service, the apparatus for controlling the user equipment comprising:

circuitry configured to apply the mapping function to all of the services to identify from among upcoming information change indicator channel frames within the present modification period, an information change indicator channel frame that includes a least ambiguous information change indicator for a service of interest, wherein the least ambiguous information change indicator for the service of interest is an information change indicator that is associated with the service of interest and with a fewest number of other services not of interest;

circuitry configured to inhibit reception of all upcoming information change indicator channel frames within the present modification period except for the identified information change indicator channel frame;

circuitry configured to receive the identified upcoming information change indicator channel frame that includes the least ambiguous information change indicator for the service of interest;

circuitry configured to control reception of the service-related information channel in the next modification period based on whether the received least ambiguous information change indicator for the service of interest is asserted; and circuitry configured to receive only that one of the information change indicator channel frames that includes a least ambiguous information change indicator for the service of interest whose reception is most compatible with other operations to be performed by the user equipment in response to more than one information change indicator channel frame that includes a least ambiguous information change indicator for the service of interest being found.

12. The apparatus of claim 11, wherein the fewest number of other services not of interest associated with the least ambiguous information change indicator is equal to zero.

* * * * *